United States Patent [19]
McMahon, Jr.

[11] 3,740,646
[45] June 19, 1973

[54] TESTING OF NON-LINEAR CIRCUITS BY ACCUMULATED RESULT COMPARISON

[75] Inventor: Maurice T. McMahon, Jr., Wappingers Falls, N.Y.

[73] Assignee: International Business Machines Corporation, Armonk, N.Y.

[22] Filed: Aug. 2, 1971

[21] Appl. No.: 168,259

[52] U.S. Cl. .......................................... 324/73 R
[51] Int. Cl. ........................................ G01r 15/12
[58] Field of Search .................... 324/73, 158, 133; 328/14; 307/209

[56] References Cited
UNITED STATES PATENTS

| | | | |
|---|---|---|---|
| 3,633,100 | 1/1972 | Heilweil | 324/73 |
| 3,617,726 | 11/1971 | Uchida | 328/14 |
| 3,614,608 | 10/1971 | Giedd | 324/73 |
| 3,636,443 | 1/1972 | Singh | 324/73 |
| 3,265,973 | 8/1966 | Darlington | 328/14 |

*Primary Examiner*—Michael J. Lynch
*Attorney*—Julius B. Kraft, Alvin J. Riddles and J. Jancin, Jr.

[57] ABSTRACT

A method and apparatus for testing complex, nonlinear, binary circuits by applying a bilevel input electrical signal pattern, made up of a plurality of pattern increments, in sequence, each comprising a plurality of parallel bilevel signals to a plurality of corresponding input points in a circuit reference. A resulting output signal pattern is sensed at a plurality of output points in the circuit reference. The output signal pattern is made up of a plurality of pattern increments, in sequence, each respectively resulting from one of the input pattern increments. The output patten increments are added in parallel to provide a reference total.

The procedure is then repeated using the identical input electrical signal pattern, except that the actual circuit to be tested is used in place of the circuit reference. The signal pattern is applied to a plurality of input points in the circuit being tested corresponding to the input points in the circuit reference, and the resulting output is sensed at a plurality of output points in said circuit corresponding to the output points in the reference. The resulting output patter increments are then added together in the same manner to provide a total for the tested circuit. This should be equal to the reference total; otherwise, the tested circuit is defective.

23 Claims, 5 Drawing Figures

TESTING OF NON-LINEAR CIRCUITS BY ACCUMULATED RESULT COMPARISON

BACKGROUND OF THE INVENTION

1. Field of the Invention

The present invention relates to the testing of circuits, particularly non-linear circuits. More specifically, it relates to a method and apparatus for testing highly complex, non-linear circuits of the type used in integrated circuits and, particularly, in large scale integration. It involves testing systems in which multilevel, e.g., bilevel, electrical signal patterns are applied to input points in the circuit being tested and the resulting output points in the circuit are sensed in order to determine whether the circuit is defective.

2. Description of the Prior Art

Co-pending application, Ser. No. 825,870, filed May 19, 1969, for a "Logic Test System", assigned to the same assignee as the present application, which is hereby incorporated by reference, relates to comparative testing of the circuit being tested against a reference which may be either a good actual circuit, a hardware simulation of a circuit, or a computerized simulation of a circuit. The test signal pattern, which is applied simultaneously to both the non-linear circuit under test and to the reference, is a multilevel pattern, particularly a bilevel signal pattern. The applied test pattern usually comprises a series of changing pattern increments, with each increment being a plurality of parallel signals, each signal being at one of said bilevels. The plurality of signals in each pattern increment is applied to a plurality of input points in the circuit under test, and also to a plurality of input points in the reference corresponding to those in the circuit under test. The outputs resulting from each applied pattern increment are taken at at least one corresponding output point in the circuit being tested and the reference and compared; a "failure to compare" in any portion of the output is indicative of a defective circuit.

An improvement on the above referenced patent application, which permits the comparative testing of sequential, non-linear circuits subject to critical race conditions, is covered in co-pending application, Ser. No. 36,523, filed May 12, 1970, for "Testing of Non-linear Circuits by Comparison with a Reference Simulation", which is also assigned to the assignee of the present invention. This latter patent application is also hereby incorporated by reference.

In the latter patent application, the reference simulation in a test system involving bilevel signal patterns is adapted to receive a three-level signal pattern input and to provide a three-level output. Means for converting the bilevel signal pattern applied to the reference simulation to a three-level signal pattern, which is to be applied to the reference, are also provided. The three-level reference simulation is so designed that when any given signal to an input point in the simulation changes between the two logic levels corresponding to the bilevel logic, a third or indeterminate level signal is applied to said input before the change is completed. In this manner, if the circuit being tested is subjected to critical race conditions as a result of the change, one or more of the output points in the reference simulation will remain at the third or indeterminate level. When this occurs, inhibiting means prevent that increment of the reference simulation output signal from being compared with the corresponding increment from the circuit being tested in order to avoid the inconsistent results brought about by such critical race conditions.

While the comparative testing approach is considered to be a highly effective approach for the testing of present and future microminiature integrated circuits, it is recognized that with the increasing complexity of large scale integrated circuits, together with anticipated future requirements for minimal design and fabrication times for such integrated circuits, test systems operating at even higher speeds may very well be required. This should especially be the case with respect to circuits operating with dynamic logic, that is, the logic in the circuit has an extremely short lifetime in the order of 50 to 100 nanoseconds. Since the comparative test systems presently in operation require from 100 to 500 nanoseconds in order to do a comparison, dynamic logic input patterns could be dissipated within the circuit before the comparison could be made.

SUMMARY OF THE INVENTION

Accordingly, it is a primary object of the present invention to provide a testing system for non-linear circuits which is of considerably higher speed than comparative test systems.

It is another object of the present invention to provide such a high speed test system which utilizes electrical signal patterns made up of a plurality of pattern increments, in sequence, applied to a plurality of input points in the circuit to be tested and sensed at a plurality of output points in said circuit.

It is an even further object of the present invention to provide a test system capable of effectively testing non-linear circuits which operate with dynamic logic, having a lifetime in the order of from 50 to 100 nanoseconds.

It is yet another object of the present invention to provide a test system, based upon a multilevel electrical signal pattern made up of a plurality of pattern increments, which does not require a highly complex hardware simulation or a computer simulation which utilizes a high degree of computer storage space and CPU times.

It is a further object of the present invention to provide such a high speed test system capable of testing both combinatorial and sequential circuits.

The present invention provides for improved high speed testing of non-linear circuits having n level logic by first developing a reference output signal pattern total as follows. To a plurality of input points in the reference circuit corresponding to the circuit to be tested, there is applied an $n$ level, usually bilevel, electrical signal pattern made up of a plurality of pattern increments, in sequence, each comprising a plurality of parallel $n$ level signals, with each signal being respectively applied to one of said plurality of input points. A resulting n level output signal pattern, made up of a plurality of pattern increments, in sequence, respectively resulting from the input pattern increments, is sensed at a plurality of output points in said circuit reference. The $n$ level, usually bilevel, values of said plurality of output pattern increments is added together to provide the reference total.

Once this reference total is established, each of the corresponding integrated circuit chips may be tested by applying an identical $n$ level electrical signal pattern to the plurality of input points in the circuit being tested, corresponding to the input points in the reference, and sensing, at a plurality of output points of the circuit being tested, corresponding to the output points in the reference, the resulting $n$ level output signal pattern which is also made up of a plurality of pattern increments, in sequence, resulting from the input pattern increments. Likewise, with respect to the circuit being tested, the $n$ level output values of the pattern increments are added together to provide a total for the circuit being tested. A comparison of the circuit total with the reference total will determine whether the circuit is defective. For a good chip, the totals should be identical.

It is, thus, seen that by this accumulation or totaling approach, the "good" or "bad" determination made by the previously mentioned comparative system, with respect to integrated circuit chips, may now be made in a simplified manner. Even with test patterns made up of many thousands of sequential increments, it is clear that should the value of any one output increment be different from the corresponding value of the reference increment, the totals must necessarily differ.

Since the increments are not being compared to each other, there is a saving in the order of from 400 to 500 nanoseconds per pattern increment. With test patterns involving thousands of increments, the testing time saved is quite substantial. In addition, instead of it being necessary to store, in a computer memory or in hardware, each of the thousands of pattern increments, it is, in the present system, only necessary to store one reference total. This results in a significant saving in storage space.

The elimination of the need for up to thousands of comparisons for each test pattern provides a substantial saving in either hardware or computer equipment and time.

In accordance with a further aspect of the present invention, there is provided a method for testing sequential, non-linear circuits which may be subject to critical race conditions. The method involves first determining whether previously described $n$ level electrical signal patterns, made up of a plurality of changing pattern increments, in sequence, produces critical race conditions in the sequential circuit to be tested, which race conditions result in an indeterminate signal level at at least one of a plurality of output points in the circuit to be tested during the application of one or more of the input pattern increments to the circuit. This detection may be achieved by converting the $n$ level signal pattern to an $n+1$ level signal pattern, in which the n levels represent the logic levels in the circuit logic and the 1 or additional level represents an indeterminate level in the circuit logic. This $n+1$ signal pattern is then applied to a reference simulation of the circuit to be tested which is adapted to receive said $n+1$ level signal pattern at a plurality of input points corresponding to the input points in the circuit being tested, and to provide a resulting $n+1$ signal level output at a plurality of output points corresponding to the output points in the circuit to be tested. With bilevel logic, the three-level signal pattern and reference simulation necessary to achieve this may be implemented in the manner described in co-pending application, Ser. No. 36,532, through the use of "double rail" logic. Using such a $n+1$ signal pattern, it is possible to detect whether the indeterminate logic level exists at one or more of the output points in the simulation as a result of the application of a change in pattern increment to the input points in the simulation.

The location of the output points having the indeterminate levels in each output pattern increment is then stored.

Next, in the manner previously described for the general embodiment of the present invention, the test pattern is applied to the plurality of input points in the reference circuit, the resulting output pattern is sensed at a plurality of output points in the circuit reference, and the n level values of all of the plurality of output pattern increments are added together, except that the output signals in each output pattern increment, which are at output points in that particular increment previously detected to be at indeterminate signal levels, are excluded from this addition, based upon the stored locations. There is, thereby, provided a reference total which excludes all indeterminate points in all of the increments of the output signal pattern.

In the same manner, the identical input signal pattern is applied to the corresponding plurality of input points in the circuit to be tested, and the resulting output signal pattern is sensed at a corresponding plurality of output points in the circuit to be tested. The values of all of the plurality of output pattern increments in the circuit to be tested are added, except those found to be at indeterminate levels in each of the output pattern increments. This provides a circuit total which excludes all output points which may be in the indeterminate state. The circuit total is compared to the reference total, and if the result is not identical, the circuit being tested is considered to be defective.

In testing non-linear sequential circuits, the system of the present invention has advantages over the system in Ser. No. 36,523 in that, with binary logic signal patterns for example, the test pattern need be converted to a three-level signal pattern only once in order to detect the indeterminate points, no matter how many circuit chips are being tested. Furthermore, the three-level reference simulation need not be converted back to two-level logic for every output pattern increment in order to make the comparison necessary in application Ser. No. 36,523.

The foregoing and other objects, features and advantages of the invention will be apparent from the following more particular description and preferred embodiments of the invention as illustrated in the accompanying drawings.

Figure 1:
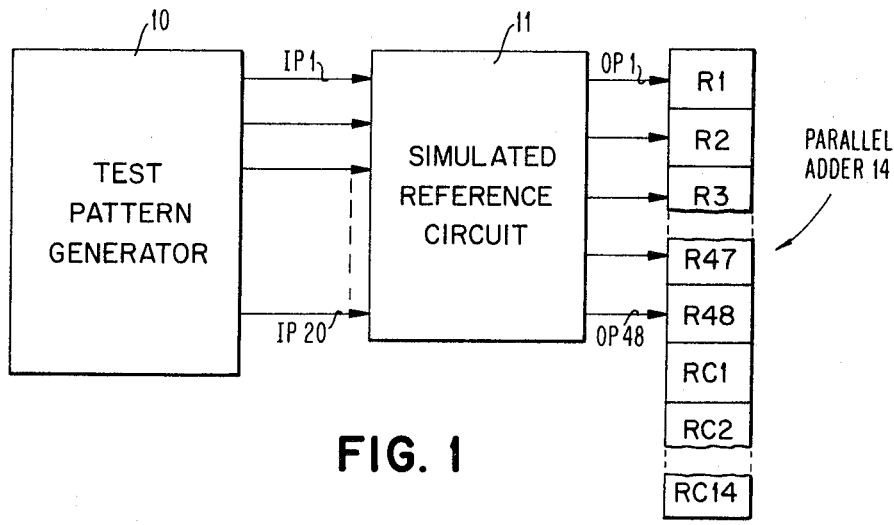
FIG. 1 is a block diagram of a general embodiment of the present invention which shows the test pattern being applied to the simulated reference circuit.
Figure 3:
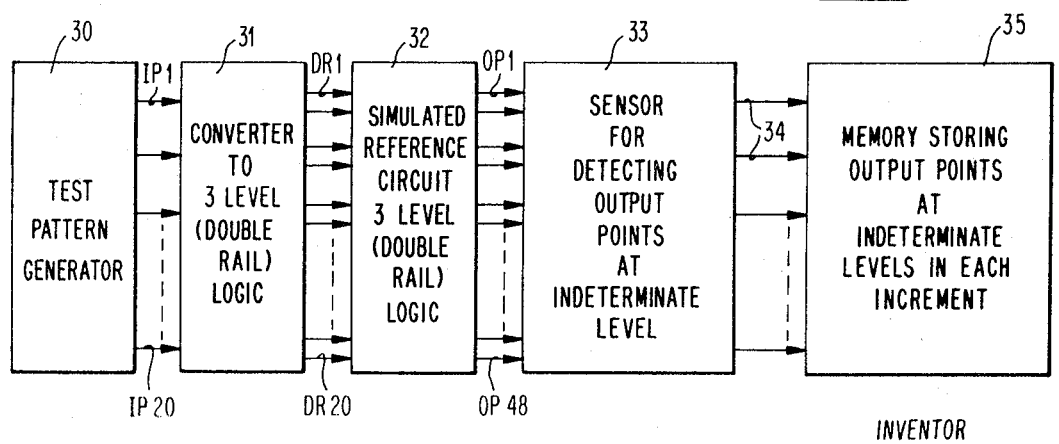
FIG. 3 is a block diagram showing the means for detecting the output points in the circuit to be tested which are at indeterminate levels in each increment of the output pattern from the circuit to be tested and for storing the positions of such output points in a memory.

With respect to FIG. 3, test pattern generator 30 is identical to test pattern generator 10 in FIG. 1, and produces a similar binary signal pattern comprising a plurality of sequential increments, each comprising a plurality of parallel signals at one of the two binary levels.

The test pattern generated by generator 30 is then applied increment by increment to converter 31 which converts each of the binary signals in each increment applied via input points IP1 through IP20 to three-level logic in the form of double rail logic on corresponding double rails DR1 through DR20.

The representation of binary logic by three-level logic, particularly in the form of double rail logic, is well known in the art, It is set forth in the test "The Logic Design of Transistor Digital Computers", G.E. Maley and J. Earle, 1963, at pp. 283-288. Apparatus which may be used to convert "single rail" binary logic to "double rail" three-level logic is described in co-pending application, Ser. No. 36,532, and particularly with respect to FIG. 6 thereof.

The double rail representation of each signal in each input pattern increment, DR1 through DR20, is then applied to a simulated reference circuit 32, having three-level, double rail logic. As a result of this applied double rail input pattern, there is produced at a plurality of output points, OP1 through OP48, an output signal pattern comprising a plurality of increments, each increment comprising a plurality of parallel signals, each of which appear at one of the double rail output points OP1 through OP48. The simulated three-level double rail logic reference circuit 32 may be simulated either in hardware or on the computer in the standard manner, as set forth in the previously mentioned text "The Logic Design of Transistor Digital Computer", or in co-pending application, Ser. No. 36,532, particularly FIGS. 7, 8 and 9 thereof.

Since there is provided at double rail output points OP1 through OP48, in addition to the two levels representing the binary 1 and 0 levels, a third or intermediate signal level, the three-level simulation must be constructed in such a manner that it will provide a definitive 1 or 0 level at each output point, when the input to the circuit is such that a definitive output can be arrived at. On the other hand, when the input is insufficient to provide a definitive output, the output will remain at the intermediate level at one or more of output points OP1 through OP48.

Each output pattern increment represented by the double rail logic output points OP1 through OP48 is applied to sensor 33 which detects in each increment the output points which remain at the indeterminate level. Means 33 for sensing or detecting output points at the indeterminate level may be constructed in the manner described in copending application, Ser. No. 36,532, particularly FIG. 7 thereof.

The sensor 33 then provides for each of the output pattern increments an output, along lines 34, which is indicative of the output points in a particular output pattern increment which remain at the indeterminate level. The pattern increment number and the output point location or number of each point in each increment remaining at the indeterminate level is then stored in memory 35, which may be any conventional computer memory. This information will enable the operator of the system who is subsequently testing circuits having sequential logic to prevent the inclusion in both the reference addition total and circuit addition total of all points in each increment having indeterminate levels due to critical race conditions.

Figure 4:
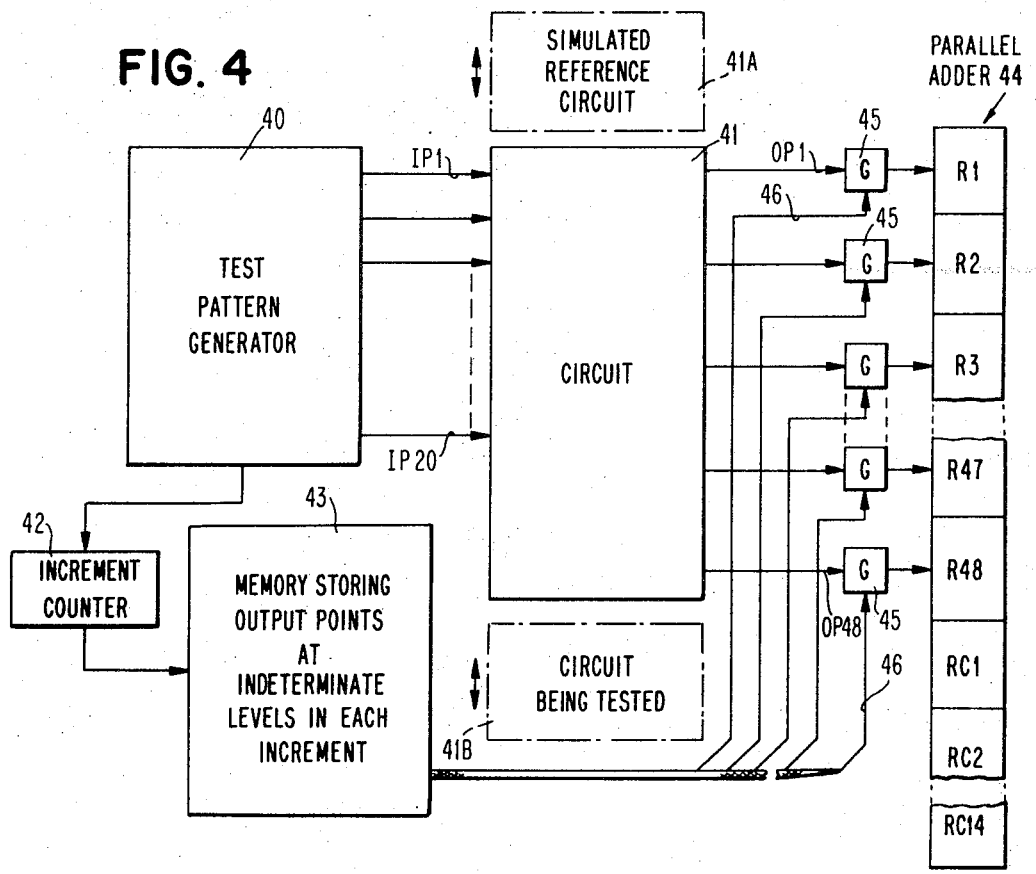
FIG. 4 is a diagram of a system for totaling the output pattern increments for both the simulated reference circuit and the circuit under test in sequential circuits subject to race conditions.

With reference to FIG. 4, we will now consider how this stored data may be utilized to prevent the inclusion of indeterminate output points. Test pattern generator 40 produces the previously described electrical test pattern produced by generator 30, each increment of which is applied via input points IP1 and IP20 to the circuit in the test position 41 which may either be the simulated reference circuit 41A, which is first tested, or any of the integrated circuits 41B, which are subsequently tested. For convenience, the simulated circuit 41A and the actual circuit being tested 41B have been shown as being interchangeable into the circuit position 41. As the test pattern generator applies each increment of the test pattern to the circuit in position 41, it also applies a stepping pulse to the increment counter 42, which produces an output to the memory storing points at indeterminate levels 43, which is indicative of the increment number.

As previously described, the circuit in position 41, in response to the test pattern, produces an output pattern comprising an equivalent plurality of increments, each of which provides an output signal on each of a plurality of parallel output points OP1 through OP48. Instead of being applied directly to 48 corresponding bit positions in parallel adder 44, the signals on each of output points OP1 through OP48 in each increment are first applied to corresponding ones of 48 gates 45. At the same time, memory 43, in response to a signal from the increment counter 42 indicative of the sequential number of the increment, produces an output signal on one or more of inhibit lines 46, each of which is connected to a different one of gates 45. An inhibit signal on one or more of lines 46 indicates that the signal on the corresponding output to the gate 45 has been previously found to be at an indeterminate level for that particular increment and so stored in the memory. Therefore, signal on line 46 prevents gate 45 from gating the signal on that particular output line to the equivalent bit position in adder 44. As a result, the signal of the output point at the indeterminate level is not added to the total and, thus, does not affect the total. Since stored information inhibits corresponding output points in the simulated circuit and all the equivalent actual circuits being tested, the reference total in parallel adder 44 should match the totals for each circuit tested. If such totals do not match, the particular circuit being tested is defective.

Figure 2:
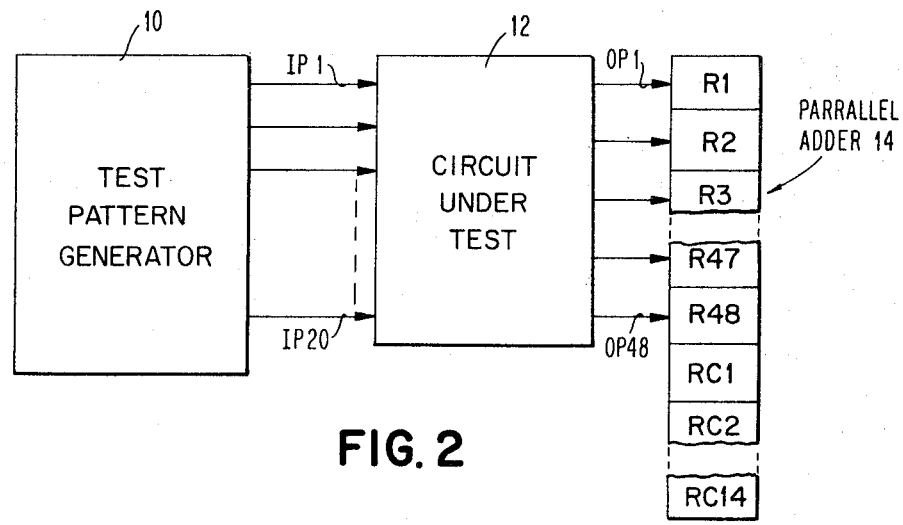
FIG. 2 is a similar generalized block diagram which shows the test pattern being applied to the circuit under test.
Figure 5:
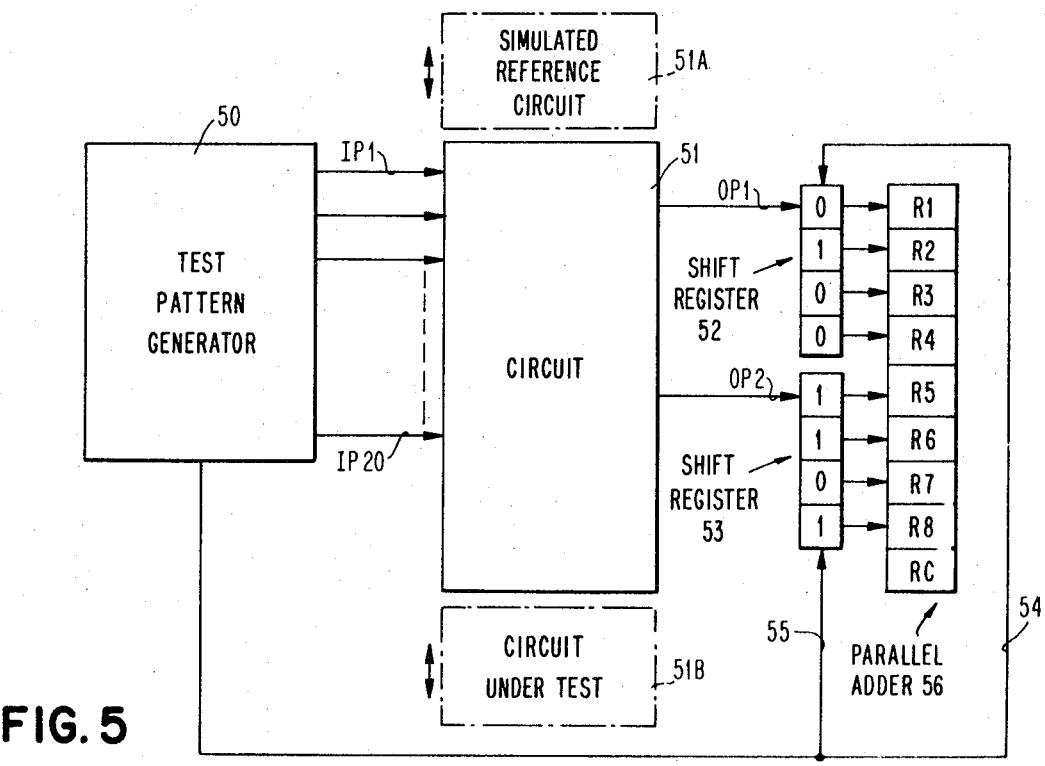
FIG. 5 is a diagram of another embodiment of the present invention for testing circuits having only a few critical race conditions) in each output pattern increment is detected and stored. Then, even if thousands of integrated circuits of the same type are to be tested, this stored information may be used to prevent the addition of any point in any increment which had been previously found to be at an indeterminate level. It is not necessary to do any further conversion to three-level logic or to use simulated three-level logic in the reference circuit.

The structure shown in FIG. 5 is a variations of the embodiment shown in FIGS. 1 and 2, particularly utilizable in testing circuits having only a few output points. The purpose of the embodiment is to increase the parallel input to the parallel adder from the small number of output points in order to minimize the possibility of offsetting errors in the output signal cancelling each other and resulting in a total wherein a defective inteoutput points from which the output signal pattern may be received.

DESCRIPTION OF THE PREFERRED EMBODIMENTS

With reference to FIGS. 1 and 2, which differ only in that the circuit in FIG. 1 being tested is the reference circuit and the circuit in FIG. 2 is the actual circuit, a test pattern generator 10 provides a bilevel test pattern of electrical signals comprising a plurality of pattern increments, each comprising a plurality of bilevel signals, with each signal to be applied to one of a plurality of input points in either the simulated reference circuit or the circuit to be tested. These input points are conveniently labeled IP1 through IP20. The test pattern generated may be a predetermined pattern having a sequence of varying pattern increments which have been determined to be in number and variety sufficient to test the circuitry to be tested. The test pattern may be prepared either manually or within a computer. It may be stored in any form of memory, e.g., in a computer or on punchcards. The stored data would merely designate the combination of 0 or 1 levels on each of the 20 inputs IP1 through IP20 for each pattern increment. A convenient method of generating a highly rapid sequence of randomly varying pattern increments would be by the pseudo-random number generator described in the above-mentioned co-pending application, Ser. No. 825,870. Since the test pattern generator in said co-pending application is actually pseudo-random, the identical test pattern may be repeated by setting the generator back at the identical starting point of the previous pattern and going through an equal number of increments.

The reference circuit 11 is an equivalent of the circuit under test, i.e., a "good" circuit under test, and could either be a simulation of the circuit in hardware or in a computer, or even a good circuit unit of the type under test. Each increment in the input signal pattern applied either to the reference circuit in FIG. 1 or to the circuit under test 12 in FIG. 2, will result in an output increment from either the reference circuit or the circuit under test comprising a plurality of parallel signals, each respectively at one of the output points in the circuit, designated OP1 through OP48. The sequence of these output signal increments will constitute the output signal pattern.

Each of the increments in the output signal pattern is then totaled to provide a reference total. This is conveniently accomplished by having each of the output points OP1 through OP48 connected to corresponding bit positions R1 through R48 in a parallel adder. Such parallel adders are well known in the art. They are described on pages 519 through 525 in the text "Digital Computer and Control Engineering", R.S. Ledly, published by McGraw-Hill Book Company, 1960. When the output points are connected to the parallel adder in such a fashion, the bilevel value on each of the output points in each increment of the output pattern will be accumulated in the parallel adder. In addition to the 48 bit positions, the parallel adder has a number of additional positions for carries. In adder 14, there are 14 carries labeled $R_{C1}$ through $R_{C14}$. The number of carries or carry bit positions is preferably determined by the number of sequential increments in the applied test pattern by the formula $2^x = m$, with m being the number of sequential increments in the applied test pattern.

Accordingly, where there are 16,000 ($2^{14}$) pattern increments in the input and output patterns, $2^x = 2^{14} = 16,000$. Since $x = 14$, there are fourteen additional bit positions or carry positions in the parallel adder of the embodiment in FIGS. 1 and 2.

In this manner, the input test pattern is applied to the simulated reference circuit, as shown in FIG. 1, and the resulting values of the increment in the output pattern are accumulated in parallel adder 14 to provide a reference total. Next, as shown in FIG. 2, each equivalent integrated circuit to be tested 12 is then subjected to the identical test pattern and the values of the increments in the output pattern accumulated in the same manner in the parallel adder 14. The total for each integrated circuit should match the reference total. If any fail to match, then, that particular integrated circuit is defective and should be rejected.

The test system described with respect to FIGS. 1 and 2 is capable of effectively testing combinatorial circuits, that is, circuits operating on combinatorial logic. Where it is necessary to test sequential circuits, additional problems arise. The problems with respect to sequential circuits have been discussed in the aforementioned co-pending application, Ser. No. 36,532. Such sequential circuits are often subject to critical race conditions, that is, the signal pattern in a given increment in the output is not only dependent upon the signal pattern in the input increment. It is also dependent upon the signal patterns in previous input increments. In other words, if in a given input pattern increment at one or more input points, there is a change from the level of the signal from the previous input pattern increment, critical race conditions may arise. As a result, at certain output points in the circuit or the reference being tested, the output signal is not consistent, that is, it may be a 1 or a 0, depending on which level "wins the race" going on within the circuit wiring as a result of the change of the input pattern. Obviously, such points cannot be included in the test in order to get meaningful results.

Co-pending application, Ser. No. 36,532, discloses a system utilizing three-level logic in order to create an additional level in the output signal pattern indicative of the indeterminate state. Where such an indeterminate state exists at any particular point in an output pattern increment in said application, that increment is not compared. It is, thus, necessary in said application during every integrated circuit being tested to convert each increment of the input signal being applied to the comparative reference from bilevel to three-level logic; the simulated reference is constructed so as to be able to handle three-level logic and to provide an indeterminate or third level value at all output points which are subject to critical race conditions due to the sequence of input signal increments. It is then necessary, in said application, to convert the three-level value of each increment in the output signal pattern from the reference back to two levels in order that it may be compared with the bilevel output pattern from the circuit under test.

With the system of the present invention, as shown in FIG. 3, a simplified approach is provided. With the present system, for each different circuit type, it is only necessary to convert the signal pattern to three-level logic and to apply such three-level logic pattern to a three-level reference simulation only once. In this manner, every output point at an intermediate level (due to grated circuit being tested produces the correct total and, therefore, appears to be a "good" circuit.

Test pattern generator 50 produces the previously described signal test pattern on input points IP1 through IP20 to the circuit in position 51. Circuit position 51 may be occupied by either the simulated reference circuit 51A, which is first tested, or any of the equivalent integrated circuits 51B which are subsequently tested. The reference circuit 51A and the circuit under test 51B are shown to be interchangeable into the circuit position. Assuming that each output signal increment only comprises two parallel signals OP1 and OP2, the effect of these signals may be increased by applying parallel signals OP1 and OP2 in each increment, respectively, to a pair of shift registers 52 and 53. When the test pattern generator produces the next sequential increment, it also provides a signal along lines 54 and 55, respectively, to shift registers 52 and 53, which step each shift register one bit position, after which the contents of each shift register is applied in parallel to corresponding bit positions in parallel adder 56. As a result, each increment in the output test pattern, which only consists of two parallel signals OP1 and OP2, is proliferated to give the effect of eight parallel signals, four for each shift register. This reduces the possibility of counter-balancing errors cancelling each other out.

Accordingly, the simulated reference circuit 51A is first tested in the manner described, and the totals in the two shift registers, after each output pattern increment, are added in parallel adder 56 to provide a reference total. Next, each integrated circuit to be tested is subjected to the same test pattern and the circuit total of each is noted and compared to the reference total. If the totals fail to compare, the integrated circuit is rejected as defective.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for testing non-linear circuits having $n$ level logic comprising:

applying to a plurality of input points in a circuit reference corresponding to the circuit being tested, an $n$ level input electrical signal pattern made up of a plurality of pattern increments, in sequence, each comprising a plurality of parallel $n$ level signals, each signal being respectively applied to one of said plurality of input points;

sensing at a plurality of output points in said circuit reference, a resulting $n$ level output signal pattern made up of a plurality of pattern increments, in sequence, respectively resulting from the input pattern increments;

adding together the $n$ level values of said plurality of output pattern increments to provide a reference total;

applying an identical $n$ level input electrical signal pattern to a plurality of input points in the circuit being tested corresponding to the plurality of input points in said circuit reference;

sensing at a plurality of output points in the circuit being tested corresponding to the plurality of output points in said circuit reference, the resulting $n$ level output signal pattern made up of a plurality of pattern increments, in sequence, resulting from the input pattern increments to the circuit being tested;

adding together the $n$ level values of said plurality of output pattern increments from the circuit being tested to provide a tested circuit total; and comparing the reference total with the tested circuit total to determine whether the tested circuit is defective.

2. The method of claim 1 wherein the circuits being tested have bilevel logic and the signals in said pattern are bilevel signals.

3. The method of claim 1 wherein said circuit reference is a simulated circuit corresponding to the circuit being tested.

4. The method of claim 3 wherein said simulated circuit is computer simulated.

5. The method of claim 1 wherein said circuit being tested is an integrated semiconductor circuit.

6. The method of claim 1 wherein said circuit being tested is a combinational circuit.

7. A method for testing non-linear sequential circuits having $n$ level logic comprising:

detecting whether an $n$ level electrical input signal pattern made up of a plurality of changing pattern increments, in sequence, each comprising a plurality of $n$ level signals to be respectively applied to one of a plurality of input points in the circuit to be tested, produces critical race conditions in the sequential circuit to be tested, which race conditions result in an indeterminate signal level at at least one of a plurality of output points in the circuit to be tested during the application of one or more of said pattern increments to the circuit to be tested;

storing the locations of the output points having indeterminate levels resulting from the application of each pattern increment;

applying to a plurality of input points in a circuit reference corresponding to said plurality of input points in the circuit to be tested, said $n$ level electrical signal pattern;

sensing at a plurality of output points in said circuit reference corresponding to said plurality of output points in the circuit to be tested, a resulting n level output signal pattern made up of a plurality of pattern increments, in sequence, respectively resulting from the input pattern increments;

adding together the n level values of all of said plurality of output pattern increments, except the output signals in each output pattern increment which are at output points previously detected to be at indeterminate signal levels, based upon said stored locations, to thereby provide a reference total;

applying said identical n level input signal pattern to said plurality of input points in the circuit being tested;

sensing at said plurality of output points in the circuit being tested, the resulting $n$ level output signal pattern made up of a plurality of pattern increments, in sequence, respectively resulting from the input pattern increments to the circuit being tested;

adding together the $n$ level values of all of said plurality of output pattern increments from the circuit being tested, except the output signals in each output pattern increment which are at output points previously detected to be at indeterminate signal levels, based upon said stored locations, to thereby provide a tested circuit total; and, comparing the reference total with the tested circuit total to determine whether the tested circuit is defective.

8. The method of claim 7 wherein the output signals in each of the output points detected to be at the indeterminate signal level are excepted from being added by inhibiting the sensed signals at said output points.

9. The method of claim 7 wherein the circuits being tested have bilevel logic and the signals in said pattern are bilevel signals.

10. The method of claim 7 wherein said circuit reference is a simulated circuit corresponding to the circuit being tested.

11. The method of claim 10 wherein said simulated circuit is computer simulated.

12. The method of claim 7 wherein the circuit being tested is an integrated semiconductor circuit.

13. The method of claim 7 wherein detecting whether said indeterminate signal levels exist is carried out by converting the n level signal pattern to an ($n+1$) level signal pattern in which the n levels represent the n levels in the circuit logic and said 1 level represents an indeterminate level in said circuit logic;

applying said ($n+1$) signal pattern to a reference simulation of the circuit to be tested adapted to receive said ($n+1$) level signal pattern at a plurality of input points corresponding to the input points in the circuit being tested and to provide a resulting ($n+1$) signal level output at a plurality of output points corresponding to the output points in the circuit to be tested; and, detecting whether said indeterminate logic level exists at one or more of said output points in said simulation as a result of the application of a pattern increment to the input points in said simulation.

14. The method of claim 13 wherein said original signal pattern is a bilevel pattern and said converted signal pattern is a three-level signal pattern.

15. Apparatus for testing non-linear circuits having $n$ level logic comprising:

means for generating an n level electrical signal test pattern made up of a plurality of pattern increments, in sequence, each comprising a plurality of parallel n level signals;

means for applying said test pattern to a plurality of input points in the circuit being tested;

means for sensing at a plurality of output points in the circuit being tested, a resulting $n$ level output signal pattern made up of a plurality of pattern increments, in sequence, respectively resulting from the applied test pattern increments; and means for adding together the n level values of said sensed plurality of output pattern increments to provide a total n level value.

16. The apparatus of claim 15 wherein the circuit being tested has bilevel logic and the signals in said test and output patterns are bilevel signals.

17. The apparatus of claim 15 wherein the circuit being tested is a simulated circuit.

18. The apparatus of claim 17 wherein said simulated circuit is computer simulated.

19. The apparatus of claim 15 wherein said means for adding is a parallel adder having a plurality of parallel bit positions corresponding to and connected to said plurality of output points in said circuit being tested.

20. The apparatus of claim 19 wherein said parallel adder has one bit position for each of said plurality of output points in the circuit being tested plus x bit positions for carries where the number of carries x is determined by the formula $2^x = m$, with m being the number of sequential increments in the applied test pattern.

21. Apparatus for testing non-linear circuits having bilevel logic comprising:

means for generating a bilevel electrical signal test pattern made up of a plurality of pattern increments, in sequence, each comprising a plurality of parallel bilevel signals;

means for applying said test pattern to a plurality of input points in the circuit being tested;

at least on shift register having a plurality of bit positions;

means for receiving, at at least one output point in the circuit being tested, a resulting bilevel output signal pattern made up of a plurality of pattern increments, in sequence, respectively resulting from the input pattern increments, and for applying the signal pattern received from one of said output points to one of said shift registers; and, adding means for adding together in parallel the bilevel values in the bit positions in said shift register resulting from the application of the output pattern increments to said shift register.

22. The apparatus of claim 21 wherein the circuit being tested is a simulated circuit.

23. The apparatus of claim 21 having a plurality of output points and a plurality of corresponding shift registers, each of which is respectively associated with one of said output points.

* * * * *